United States Patent [19]
Ridland et al.

[11] Patent Number: 5,391,643
[45] Date of Patent: Feb. 21, 1995

[54] POLYESTER RESIN POWDER COATING COMPOSITIONS

[75] Inventors: John Ridland, Durham; Brian S. Jolly, Cleveland, both of England

[73] Assignee: Tioxide Specialties Limited, London, England

[21] Appl. No.: 240,548

[22] Filed: May 11, 1994

[30] Foreign Application Priority Data

May 19, 1993 [GB] United Kingdom ............... 9310290

[51] Int. Cl.$^6$ ............................................. C08L 67/02
[52] U.S. Cl. .................................. 525/437; 525/445; 525/448; 525/934
[58] Field of Search ............... 525/437, 934, 445, 448

[56] References Cited
FOREIGN PATENT DOCUMENTS

| | | |
|---|---|---|
| 52-081346 | 7/1977 | Japan . |
| 53-073225 | 6/1978 | Japan . |
| 53-073226 | 6/1978 | Japan . |
| 55-116761 | 9/1980 | Japan . |
| 56-074155 | 6/1981 | Japan . |
| 57-044681 | 3/1982 | Japan . |
| 0994717 | 6/1965 | United Kingdom . |
| 1516829 | 7/1978 | United Kingdom . |
| 1566060 | 4/1980 | United Kingdom . |

*Primary Examiner*—Patricia A. Short
*Attorney, Agent, or Firm*—Baker & Botts

[57] ABSTRACT

The invention consists of a new method of curing a polyester powder coating composition. The resin is cured by the use of an organotitanium or organozirconium derivative of an alkanolamine having the formula $M_3[(OR)_3N]_4$ or $O[M(OR)_3N]_2$ or $R^1[OM(OR)_3N]_x$ where M represents Ti or Zr, R represents a divalent aliphatic radical, x is 1 to 4 and $R^1$ is a saturated hydrocarbyl group or a group containing one or more ether linkages. The method is suitable for use with both hydroxyl-rich and carboxyl-rich polyester resins and the cured coatings have desirable physical properties.

23 Claims, No Drawings

POLYESTER RESIN POWDER COATING COMPOSITIONS

This invention relates to powder coating compositions based on polyester resins and in particular to the use of certain organotitanium or organozirconium compounds to cure polyester resin powder coating compositions.

Coating compositions comprising powdered thermosetting compositions are increasingly used for the formation of highly durable and decorative finishes. Such compositions, usually known as powder coating compositions are frequently based on polyester resins which can be prepared by the reaction of polyhydric alcohols and polybasic acids and in which the molar ratio of alcohol to acid can be adjusted to produce resins which contain an excess of hydroxyl groups over acid groups (hydroxyl-rich resins) or resins which contain an excess of acid groups over hydroxyl groups (carboxyl-rich resins).

The carboxyl-rich resins are frequently cured by cross-linking with an isocyanurate such as triglycidyl isocyanurate (TGIC) to produce durable coatings ideally suitable for exterior use. However, there is now a desire to reduce the use of triglycidyl isocyanurate.

Cross-linking of carboxyl-rich resins with epoxy resins such as resins based on bisphenol A is known to produce resins which are frequently called hybrid resins. However these resins do not possess the same properties or exterior durability as those produced by cross-linking with triglycidyl isocyanurate.

Coatings having good exterior durability can also be produced by cross-linking hydroxyl-rich resins with isocyanates. These isocyanates may be blocked, for example with caprolactam, to prevent premature reaction with the polyester. However, there is now a general trend within the coating industry to avoid the use of caprolactam-blocked isocyanates when possible.

It is an object of the invention to provide an alternative method for curing polyester resin powder coating compositions which is suitable for hydroxyl-rich and/or carboxyl-rich resins and provides cured coatings with desirable properties.

According to the invention a method of curing a powder coating composition comprises reacting a polyester resin with an organotitanium compound or an organozirconium compound which is a derivative of an alkanolamine and has the formula $M_3[(OR)_3N]_4$ or the formula $O[M(OR)_3N]_2$ or the formula $R^1[O M(OR)_3N]_x$ in which, in each formula, M represents titanium or zirconium, R represents a divalent aliphatic radical, x is 1 to 4 and $R^1$ is a saturated hydrocarbyl group or a group containing one or more ether linkages.

The polyester resins which can be used in the method of the invention can be those which are described as hydroxyl-rich or those which are described as carboxyl-rich. They can be prepared from polybasic carboxylic acids or their esterifiable derivatives and from polyols by any suitable known process.

Polybasic acids which are useful for their preparation include aromatic, cycloaliphatic or aliphatic carboxylic acids such as terephthalic acid, isophthalic acid, phthalic acid, trimellitic acid, pyromellitic acid, hexahydrophthalic acid, adipic acid and sebacic acid. Esters of these acids with monohydric alcohols, for example dimethyl terephthalate or acid anhydrides such as phthalic anhydride can also be used as reactants for preparing the polyesters in place of the equivalent acid.

Suitable polyhydric alcohols include 1,2-ethanediol (ethylene glycol), 1,2-propanediol, trimethylolpropane, neopentyl glycol, 1,3-butanediol, 1,4-butanediol, pentaerythritol, glycerol, tris(hydroxyethyl)isocyanurate and ethoxylated bisphenol A (2,2-bis[4,4'-hydroxyethoxyphenyl]propane).

Preferably the polyesters are branched and have a high melting point.

The molar ratio of the raw materials used for polyester production is selected so as to ensure an excess of either hydroxyl groups (hydroxyl-rich resins) or carboxyl groups (carboxyl-rich resins). Typically, hydroxyl-rich resins which are commercially available have a hydroxyl number between 20 and 150 mg KOH per gram. For the practice of this invention the preferred hydroxyl number is between 15 and 100 mg KOH per gram and more preferably between 15 and 60 mg KOH per gram. Such resins usually have an acid number of from 0 to 15 mg KOH per gram. Typical, commercially available carboxyl-rich resins which are of use in the method of the invention have an acid number of from 15 to 100 mg KOH per gram and preferably from 15 to 60 mg KOH per gram and a hydroxyl number of less than 30 mg KOH per gram and preferably less than 10 mg KOH per gram.

Resins which are a copolymer of a polyester and another polymer are useful in the practice of the invention and such copolymers include copolymers of acrylic polymers containing carboxyl groups.

The titanium or zirconium compounds which are of use in the method of the invention are all derivatives of alkanolamines and the structural formulae of these compounds are discussed below.

Compounds having the formula $M_3[(OR)_3N]_4$ (wherein M is Ti or Zr) are known as tetrakis (trialkanolamine) trititanates or tetrakis (trialkanolamine) trizirconates. Structures shown below as (I) and (II) have been proposed for tetrakis(trialkanolamine) trititanates.

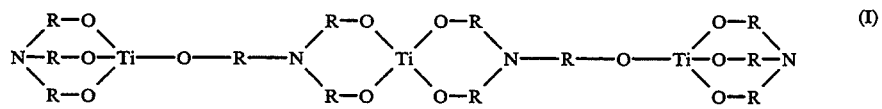

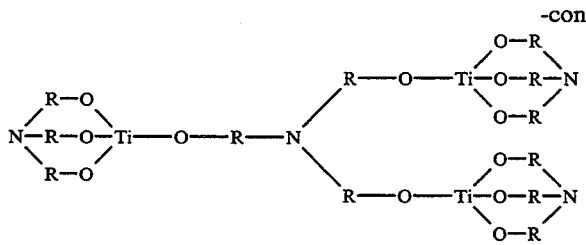

Compounds having the formula $R^1[OM(OR)_3N]_x$ are titanium or zirconium derivatives of trialkanolamines and either monohydric alcohols, dihydric alcohols, trihydric alcohols or tetrahydric alcohols. One form of the titanium derivatives of monohydric alcohols (x=1) is believed to be illustrated by the structure (III) below although some compounds in this class of compounds are believed to have a dimeric or polymeric structure.

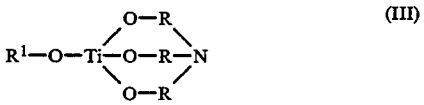

The equivalent compounds derived from dihydric, trihydric or tetrahydric alcohols (x=2, 3 or 4) are believed to have more complex structures and no specific structures have generally been proposed.

The titanium compounds having the formula $O[-Ti(OR)_3N]_2$ contain titanium-oxygen-titanium (Ti—O—Ti) linkages as shown in structure (IV) below. However, it is believed that a number of other molecular structures containing Ti—O—Ti linkages also exist.

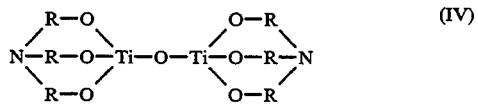

In the compounds of use in the invention R represents a divalent radical. Preferably R is —CH$_2$—CH$_2$— or —CH(CH$_3$)CH$_2$— and the organotitanium or organozirconium compounds are derivatives of triethanolamine or triisopropanolamine respectively.

In Structure (III) $R^1$ represents an alkyl group or an oxyalkyl group which preferably contains from 1 to 8 carbon atoms, more preferably 1 to 6 carbon atoms. Most preferably $R^1$ is methyl, ethyl, n-propyl, isopropyl, n-butyl or ethoxyethyl.

The invention also encompasses the use of compounds in which the group $R^1$ is derived from a dihydric, a trihydric or a tetrahydric alcohol. Alcohols which are useful for preparing these compounds include dihydric alcohols such as 1,2-ethanediol (ethylene glycol), 1,2-propanediol, 1,3-propanediol, 1,3-butanediol, 1,4-butanediol, diethylene glycol, polyethylene glycol and polypropylene glycol, trihydric alcohols such as glycerol, trimethylolethane and trimethylolpropane and tetrahydric alcohols such as pentaerythritol.

All the organotitanium or organozirconium compounds can be readily prepared by reaction of a chosen alkanolamine with a titanium or zirconium tetraalkoxide in an appropriate molar ratio followed by the removal of alcohol which is displaced. For example, reaction of 4 moles of triethanolamine with 3 moles of titanium tetraisopropoxide followed by removal of isopropyl alcohol generated produces tetrakis(triethanolamine) trititanate of Formula I or II in which R represents —CH$_2$—CH$_2$—. The reaction of 1 mole triethanolamine with 1 mole titanium tetraisopropoxide produces a compound of Formula III in which R represents —CH$_2$—CH$_2$— and $R^1$ represents the isopropyl group. This can be converted to other compounds useful in the invention by the addition of an appropriate quantity of a dihydric, trihydric or tetrahydric alcohol followed by further removal of isopropyl alcohol generated.

An alternative method for the preparation of tetrakis(triethanolamine) trititanate involves preparing a mixture of triethanolamine and titanium tetraisopropoxide in appropriate proportions in a hydrocarbon solvent such as a mixture of heptanes. The isopropyl alcohol generated by reaction is removed by heating the mixture under vacuum at a temperature below about 50° C.

The quantity of organotitanium or organozirconium compound used in the method of the invention depends on, amongst other factors, the desired degree of crosslinking of the polyester resin and the nature of the polyester resin. Generally, from 2 to 10 per cent by weight is used and preferably the quantity is from 5 to 8 per cent by weight based on weight of resin.

Before curing the powder coating composition the organotitanium or organozirconium compound is thoroughly mixed with the polyester resin. Typically, the resin and organotitanium or organozirconium compound, together with other ingredients such as pigments and flow modifiers are firstly mixed as a powder in a high intensity mixer such as a Henschel mixer. Suitable pigments include inorganic pigments such as titanium dioxide and iron oxide and organic pigments such as carbon black and phthalocyanine blue. In addition inorganic extenders such as barium sulphate or calcium carbonate may be added as pan of the pigmentary system. Compounds which are useful as flow modifiers include silicones and polyacrylates such as polybutyl acrylate and butyl/ethyl hexyl acrylate copolymers.

The mixed powder is usually subsequently fed to an extruder of a type conventionally used for powder coating compositions such as a Buss-Ko-Kneader PR44. The extruder forms a semi-molten mass from the mixed powder at a temperature of about 90° C. to 120° C. and this extrudate is cooled to form a brittle solid which is then pulverised in a suitable mill such as a pin mill, to produce a powder coating composition. Usually the powder coating is sieved before application to ensure the absence of oversized particles.

In use the powder coating composition is coated on to the surface to be treated in any convenient manner. For the treatment of aluminium or steel, for example, electrostatic spraying is commonly employed as this technique produces a very uniform coating even on inaccessible surfaces. An alternative technique which is extremely useful is triboelectric spraying.

The coated surface is then heated to a sufficiently high temperature to allow the resin to coalesce and cure by cross-linking the free hydroxyl or carboxyl groups in the polyester resin by means of the organotitanium or organozirconium compound. The temperature at which the resin is cured depends to some extent upon the glass transition temperature and the softening point of the resin and the reactivity of the cross-linking agent but generally is in the range 140° C. to 220° C. The resin is normally fully cured by heating at a temperature in this range for a period of between 5 and 30 minutes, more usually between 5 and 20 minutes. Typical curing schedules for carboxyl-rich polymers are 15 to 20 minutes at 160° C., 10 to 20 minutes at 180° C. or 6 to 10 minutes at 200° C. For hydroxyl-rich resins typical schedules are 15 to 20 minutes at 190° C. or 10 to 15 minutes at 200° C.

A number of well-known tests are used to assess the quality of the finished coating. Typically, a methyl ethyl ketone double-rub test is used to assess the degree of cure and reverse impact and bend tests are used to confirm the degree of cross-linking and to assess the integrity of the coating and its bonding to the coated surfaces. Colour and gloss of the finished coatings are also important properties of the cured resin.

The coatings cured according to the method of the current invention are of acceptable quality when assessed by these tests. The organotitanium and organozirconium compounds are active cross-linkers which are solid and have a low volatility.

The invention is illustrated by the following examples.

EXAMPLE 1

Triethanolamine (298.0 g, 2.0 moles) was added to titanium tetraisopropoxide (426.0 g, 1.50 moles) in a 1 liter fishbowl flask fitted with air-driven stirrer, thermometer and condenser. The clear yellow liquid obtained was heated in stages to 90° C. under vacuum to remove the isopropanol by-product, to give a viscous resin which cooled to a glassy solid with a titanium content of 18.16% by weight.

EXAMPLE 2

Triethanolamine (198.9 g, 1.33 moles) was added to a solution of titanium tetraethoxide in a commercial mixture of heptanes (456.1 g) in a 1 liter fishbowl flask fitted with an air-driven stirrer, thermometer and condenser. The clear yellow liquid obtained was stripped of ethanol/heptanes at 21° C. to 50° C. under vacuum to give a viscous resin which cooled to a glassy solid having a titanium content of 18.30% by weight.

EXAMPLE 3

Water (9.7 g, 0.54 moles) and triethanolamine (157.8 g, 1.06 moles) were mixed and added to titanium tetraisopropoxide (300.6 g, 1.06 moles) in a rotary evaporator flask. The mixture was heated under vacuum to remove the released isopropanol to yield a friable pale yellow solid having a titanium content of 20.11% by weight.

EXAMPLE 4

Triethanolamine (70.1 g, 0.47 moles) was added to titanium tetraisopropoxide (100.1 g, 0.35 moles) in a rotary evaporator flask and mixed for five minutes. Ethylene glycol (7.3 g, 0.12 moles) was then added and the product mixed for 5 minutes before heating and removing isopropanol under vacuum to yield a pale yellow friable solid having a titanium content of 16.07% by weight.

EXAMPLE 5

Triethanolamine (105.0 g, 0.70 moles) was added to titanium tetraisopropoxide (200.0 g, 0.70 moles) in a rotary evaporator flask, mixed for five minutes, then heated under vacuum to remove isopropanol until a constant product weight was achieved. Diethylene glycol (37.1 g, 0.35 moles) was then added and the product reheated under vacuum to remove further isopropanol to yield a yellow glassy solid.

EXAMPLE 6

Following the method of Example 5, triethanolamine (52.6 g, 0.35 moles) was added to titanium tetraisopropoxide (100.0 g, 0.35 moles) and the product heated under vacuum to remove isopropanol. Glycerol (10.9 g, 0.12 moles) was then added and the product reheated under vacuum to remove isopropanol and yield a yellow friable solid having a titanium content of 17.92% by weight.

EXAMPLE 7

Following the method of Example 5, triethanolamine (52.6 g, 0.35 moles) was added to titanium tetraisopropoxide (100.1 g, 0.35 moles) and the product heated under vacuum to remove isopropanol. Monopropylene glycol (13.4 g, 0.18 moles) was then added and the product reheated under vacuum to remove isopropanol and yield a white friable solid with a titanium content of 17.85% by weight.

EXAMPLE 8

Molten triisopropanolamine (286.9 g, 1.5 moles) was added slowly to titanium tetraisopropoxide (426.2 g, 1.5 moles) in a rotary evaporator flask. The contents of the flask were mixed for 5 minutes and then heated under vacuum to remove isopropanol to yield a white solid having a titanium content of 16.21% by weight.

EXAMPLE 9

Triethanolamine (298.1 g, 2.0 moles) was added to titanium tetraisopropoxide (568.1 g, 2.0 moles) in a rotary evaporator flask. The contents of the flask were mixed for 10 minutes and isopropanol removed by heating under vacuum. The product was a mobile yellow liquid at 90° C. which cooled to a glassy solid having a titanium content of 19.99% by weight.

EXAMPLE 10

Zirconium tetra-n-propoxide in n-propanol (431.8 g, 1 mole zirconium propoxide) was mixed with a commercial mixture of heptanes (1250.0 g) in a 2 liter fishbowl flask fitted with air-driven stirrer, condenser and thermometer. Triethanolamine (149.2 g, 1.0 mole) was added from a dropping funnel to the mixture which was stirred at reflux for 30 minutes. On cooling, a solid precipitate was recovered by filtration and dried to yield a white powder having a zirconium content of 31.15% by weight.

EXAMPLE 11

Triethanolamine (540.3 g, 3.62 moles) was added to titanium tetraisopropoxide (769.7 g, 2.71 moles) in a rotary evaporator flask. The contents of the flask were mixed for 15 minutes and isopropanol removed by heating under vacuum to a maximum temperature of 130° C. to yield a friable yellow solid having a titanium content of 19.82% by weight.

EXAMPLE 12

Reactivity Test 1

The reactivity of the organotitanium or organozirconium cross-linkers towards polyester resins can be simply checked using a gel time test. 7 parts cross-linker were ground with 93 parts polyester resin (see Table 1) with a mortar and pestle. Approximately 0.7 g of this mixture was placed in a depression in a thermostatically controlled heated aluminium block. The temperature was preset to 200° C. The molten mixture was stirred with a wooden cocktail stick and the time in seconds noted for gelation (snapback of molten thread) to occur. When gelation did not occur within 360 seconds the appearance of the resin after 360 seconds was noted and is described in Table 2.

TABLE 1

| RESIN | OH Value | Acid Value | Viscosity at 165° C. |
|---|---|---|---|
| Uralac P2400 (1) | — | 30–37 mg/KOH/g | 700 dPa · s |
| Uralac P2115 (1) | 30–45 | 10 max mg/KOH/g | 550 dPa · s |
| Neocrest P660 (2) | — | 28–40 mg/KOH/g | |

(1) Supplied by DSM resins
(2) Supplied by Zeneca resins

TABLE 2

| Product of Example No. | Gel time (secs) at 200°C. | | |
|---|---|---|---|
| | P2115 | P2400 | P660 |
| 1 | 235 | 390 | 260 |
| 2 | 300 | 285 | 195 |
| 3 | 315 | very thick | — |
| 4 | 270 | 290 | — |
| 5 | 325 | 180 | — |
| 6 | 365 | very thick | — |
| 7 | 345 | No gel | — |
| 8 | No gel | 330 | — |
| 9 | very thick | 95 | 185 |
| 10 | No gel | 275 | No gel |
| 11 | 270 | 185 | 205 |

EXAMPLE 13

Reactivity Test 2

The reactivity of the organotitanium or organozirconium cross-linkers towards simple coating formulations shown below (in Table 3) may also be checked by carrying out the above gel time test. Powders were prepared by grinding resin, pigment, cross-linker and flow modifier together, heating to 120° C. for 30 minutes, then cooling, regrinding and sieving (85 mesh, 180 micrometers). A simple indication of flow was obtained by drawing the powders down on lo Bonderite 711 aluminium plates to a depth of 1 mm and curing at 200° C. for 10 minutes in an oven. The coatings were then visually assessed on a scale of 1 to 10 where 1=glassy smooth, 10=very rough.

Results are given in Table 4.

TABLE 3

| Formulation | (A) (5 wt % cross-linker on resin) | (B) (7 wt % cross-linker on resin) |
|---|---|---|
| TiO$_2$ (Tioxide RTC90) (3) | 3.90 parts | 3.90 parts |
| Resin (1) (2) | 5.50 | 5.50 |
| Cross-linker | 0.28 | 0.40 |
| Flow modifier (4) | 0.10 | 0.10 |

(1) Uralac P2400 or Uralac P2115 supplied by DSM Resins
(2) Neocrest P660 supplied by Zeneca Resins
(3) TiO$_2$ (RTC90) supplied by Tioxide
(4) Modaflow supplied by Monsanto

TABLE 4

| Product of Example No. | Resin | Formulation | Gel Time Secs (200° C.) | Flow Grading |
|---|---|---|---|---|
| 1 | P2115 | A | 160 | 6 |
| 1 | P2115 | B | 240 | 7 |
| 1 | P2400 | A | 270 | — |
| 1 | P2400 | B | 350 | 7 |
| 1 | P660 | A | 320 | — |
| 1 | P660 | B | 380 | 8 |
| 3 | P2115 | B | 420 | 6 |
| 5 | P2115 | B | 300 | 6 |
| 5 | P2400 | B | V thick after 480 secs. | 5 |
| 6 | P2115 | B | 435 | 4 |
| 7 | P2115 | B | 325 | 4 |
| 9 | P2400 | B | 270 | 7 |

EXAMPLE 14

The use of the organotitanium or organozirconium cross-linkers in a powder coating formulation (see Table 5) was demonstrated by the following method.

Hydroxy-rich polyester resin, for example Uralac P2115, or carboxy rich polyester resin, for example Uralac P2400 or Neocrest P660, was mixed with pigment, flow modifier and a cross-linker of the invention in a Henschel mixer at 1800 rpm for 5 minutes. This powder was subsequently fed to a Buss-Ko-Kneader PR44 extruder, with barrel temperature 105° C. The extrudate was pulverised using a pin mill and sieved to give a maximum particle size of 75 micrometer. This powder was then electrostatically sprayed at a voltage of 90 kV to a thickness of ca 50 micrometers on Bonderite 711 aluminium plates. These plates were then heated in an oven at either 180° C. or 200° C. for either 10 or 20 minutes to facilitate cure.

The cure was assessed using the widely used MEK (methyl ethyl ketone) double-rub method. Impact tests were also carried out.

TABLE 5

| Formulation | Weight |
|---|---|
| TiO$_2$ (1) | 375 parts |
| Resin (2) | 525 parts |
| Cross-linker (3) | 44 parts |
| Flow modifier (4) | 63 parts |

(1) The TiO$_2$ was Tioxide RTC4 supplied by Tioxide
(2) The resins were Uralac P2400 or Uralac P2115 supplied by DSM Resins or Neocrest P660 supplied by Zeneca Resins.
(3) The cross-linkers were organic titanium compounds made according to the Examples in this invention. Triglycidyl isocyanurate (TGIC) was tested in Uralac P2400 for comparison.
(4) The flow modifier used for Uralac P2400 resin and Neocrest P660 resin was Acronal 4F supplied by BASF A.G. This was added as a 10% by weight masterbatch in Uralac P2400. The flow modifier used for Uralac P2115 was Modaflow supplied by Harcros Chemicals Ltd. and this was added as a 10% by weight masterbatch in Uralac P2115.

TABLE 6

Uralac P2400 Results

| Product of Example No. | Curing Schedule °C./mins | MEK (a) Double Rubs | Impact (b) Test |
|---|---|---|---|
| 1 | 200/10 | 200(4) | 4 |
| 4 |  | 200(4) | 1 |
| 5 |  | 200(4) | 2 |
| TGIC |  | 200(4) | 1 |
| 1 | 200/20 | 200(5) | 1 |
| 4 |  | 200(5) | 0 |
| 5 |  | 200(5) | 0 |
| TGIC |  | 200(4) | 1 |
| 1 | 180/10 | 68 | 5 |
| 4 |  | 23 | 5 |
| 5 |  | 29 | 5 |
| TGIC |  | 11 | 1 |
| 1 | 180/20 | 200(4) | 3 |
| 4 |  | 93 | 5 |
| 5 |  | 114 | 5 |
| TGIC |  | 200(4) | 1 |

TABLE 7

Uralac P2115 Results

| Product of Example No. | Curing Schedule °C./mins | MEK (a) Double Rubs | Impact (b) Test |
|---|---|---|---|
| 1 | 200/10 | 200(5) | 1 |
| 4 |  | 200(5) | 1 |
| 5 |  | 200(5) | 0 |
| 3 |  | 200(5) | 1 |
| 7 |  | 200(5) | 1 |
| 6 |  | 200(4) | 1 |
| 1 | 200/20 | 200(5) | 0 |
| 4 |  | 200(5) | 0 |
| 5 |  | 200(5) | 1 |
| 3 |  | 200(4) | 0 |
| 7 |  | 200(5) | 0 |
| 6 |  | 200(5) | 1 |
| 1 | 180/10 | 71 | 5 |
| 4 |  | 122 | 5 |
| 5 |  | 200(2) | 4 |
| 3 |  | 25 | 1 |
| 7 |  | 39 | 5 |
| 6 |  | 12 | 2 |
| 1 | 180/20 | 200(4) | 3 |
| 4 |  | 200(4) | 1 |
| 5 |  | 200(5) | 3 |
| 3 |  | 25 | 4 |
| 7 |  | 200(4) | 1 |
| 6 |  | 16 | 2 |

TABLE 8

Neocrest P660 Results

| Product of Example No. | Curing Schedule °C./mins | MEK (a) Double Rubs | Impact (b) Test |
|---|---|---|---|
| 1 | 200/10 | 198 | 1 |
| 5 |  | 64 | 1 |
| TGIC |  | 136 | 1 |
| 1 | 200/20 | 200(4) | 1 |
| 5 |  | 200(4) | 1-2 |
| TGIC |  | 200(4) | 0-1 |
| 1 | 180/10 | 12 | 1 |
| 5 |  | 9 | 3 |
| TGIC |  | 10 | 1 |
| 1 | 180/20 | 21 | 2 |
| 5 |  | 12 | 2 |
| TGIC |  | 138 | 1 |

(a) Resistance to MEK double rubs. Where the aluminium panel was exposed before 200 double rubs were reached, the number of rubs were recorded. If 200 double rubs were made without exposing the aluminium panel, the coatings were visually assessed on a scale of 0 to 5 with 5 being undamaged (no loss of coating or gloss). Uncrosslinked coatings survive 4 to 6 double rubs before the aluminium panel is exposed.

(b) Films of ca 50 micrometer thickness were subjected to a reverse impact of 4.75 kg applied vertically through 570 mm using a hemispherical steel probe (14 mm diameter). Each panel was visually assessed on a scale of 0–5 on the degree of cracking with 0 being no cracking/flaking and 5 being severe cracking with detachment of the coating.

We claim:

1. A method of curing a powder coating composition comprising reacting a polyester resin with a curing agent selected from the group consisting of organotitanium derivatives of alkanolamines and organozirconium derivatives of alkanolamines having one of the formulae
   (a) $M_3[(OR)_3N]_4$
   (b) $O[M(OR)_3N]_2$ or
   (c) $R^1[OM(OR)_3N]_x$ in which, in each formula, M is selected from the group consisting of titanium and zirconium, R is a divalent aliphatic radical, x is 1 to 4 and $R^1$ is selected from the group consisting of saturated hydrocarbyl groups and groups containing at least one ether linkage.

2. A method according to claim 1 in which R is a divalent radical selected from the group consisting of —$CH_2$—$CH_2$— and —$CH(CH_3)CH_2$—.

3. A method according to claim 1 in which $R^1$ contains from 1 to 8 carbon atoms and is selected from the group consisting of alkyl groups and oxyalkyl groups.

4. A method according to claim 1 in which $R^1$ is selected from the group consisting of methyl, ethyl, n-propyl, isopropyl, n-butyl and ethoxyethyl.

5. A method according to claim 1 in which $R^1$ represents a group derived from an alcohol selected from the group consisting of 1,2-ethanediol, 1,2-propanediol, 1,3-propanediol, 1,3-butanediol, 1,4-butanediol, diethylene glycol, polyethylene glycol, polypropylene glycol, glycerol, trimethylolethane, trimethylolpropane and pentaerythritol.

6. A method according to claim 1 in which the polyester resin is an ester of an acid selected from the group consisting of terephthalic acid, isophthalic acid, phthalic acid, trimellitic acid, pyromellitic acid, hexahydrophthalic acid, adipic acid and sebacic acid.

7. A method according to claim 1 in which the polyester resin is an ester of an alcohol selected from the group consisting of 1,2-ethanediol, 1,2-propanediol, trimethylolpropane, neopentyl glycol, 1,3-butanediol, 1,4-butanediol, pentaerythritol, glycerol, tris(hydroxyethyl) isocyanurate and ethoxylated bisphenol A.

8. A method according to claim 1 in which the polyester resin is a hydroxyl-rich resin having a hydroxyl number between 20 and 150 mg KOH per gram.

9. A method according to claim 8 in which the polyester resin has an acid number of from 0 to 15 mg KOH per gram.

10. A method according to claim 1 in which the polyester resin is a carboxyl-rich resin having an acid number between 15 and 100 mg KOH per gram.

11. A method according to claim 10 in which the polyester resin has a hydroxyl number less than 30 mg KOH per gram.

12. A method according to claim 1 in which the polyester resin is a copolymer of a polyester and an acrylic polymer containing carboxyl groups.

13. A method according to claim 1 in which the curing agent is present in an amount of from 2 to 10 per cent by weight based on weight of polyester resin.

14. A method according to claim 1 in which the powder coating composition is cured at a temperature in the range 140° C. to 220° C. for a period between 5 and 30 minutes.

15. A method according to claim 14 in which the polyester is a carboxyl-rich polyester and the powder coating composition is cured by heating at a temperature of 160° C. for a period between 15 and 20 minutes.

16. A method according to claim 14 in which the polyester is a carboxyl-rich polyester and the powder coating composition is cured by heating at a temperature of 180° C. for a period between 10 and 20 minutes.

17. A method according to claim 14 in which the polyester is a carboxyl-rich polyester and the powder coating composition is cured by heating at a temperature of 200° C. for a period between 6 and 10 minutes.

18. A method according to claim 14 in which the polyester is a hydroxyl-rich polyester and the powder coating composition is cured at 190° C. for a period between 15 and 20 minutes.

19. A method according to claim 14 in which the polyester is a hydroxyl-rich polyester and the powder coating composition is cured at 200° C. for a period between 10 and 15 minutes.

20. A method according to claim 1 in which the organotitanium compound is tetrakis(triethanolamine) trititanate and is prepared by mixing triethanolamine and titanium tetraisopropoxide in a hydrocarbon solvent and subsequently removing, by heating the mixture formed at a temperature below 50° C., isopropyl alcohol generated.

21. A method according to claim 1 in which a pigment or a flow modifier is mixed with the polyester resin and the curing agent before the powder coating composition is cured.

22. A method according to claim 1 in which the polyester resin is mixed with the curing agent and the resulting mixture is fed to an extruder, extruded at a temperature of 90° C. to 120° C., cooled and pulverised.

23. A composition suitable for use as a powder coating composition comprising a mixture of a polyester resin and a curing agent selected from the group consisting of organotitanium derivatives of alkanolamines and organozirconium derivatives of alkanolamines having one of the formulae (a) $M_3[(OR)_3N]_4$
(b) $O[M(OR)_3N]_2$ or
(c) $R^1[OM(OR)_3N]_x$ in which, in each formula, M is selected from the group consisting of titanium and zirconium, R is a divalent aliphatic radical, x is 1 to 4 and $R^1$ is selected from the group consisting of saturated hydrocarbyl groups and groups containing at least one ether linkage.

* * * * *